United States Patent
Youngs et al.

(10) Patent No.: US 9,220,000 B1
(45) Date of Patent: Dec. 22, 2015

(54) TEMPORARY DEVICE NUMBERS FOR TEXT MESSAGING

(71) Applicant: Sprint Communications Company L.P., Overland Park, KS (US)

(72) Inventors: Simon Youngs, Overland Park, KS (US); Gary Duane Koller, Overland Park, KS (US); Mark Douglas Peden, Olathe, KS (US); Raymond Emilio Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 13/886,966

(22) Filed: May 3, 2013

(51) Int. Cl.
*H04W 4/00* (2009.01)
*H04W 4/12* (2009.01)
*H04W 88/18* (2009.01)
*H04M 3/42* (2006.01)
*H04W 4/14* (2009.01)
*H04W 12/02* (2009.01)

(52) U.S. Cl.
CPC ............ *H04W 4/12* (2013.01); *H04M 3/42008* (2013.01); *H04W 4/14* (2013.01); *H04W 12/02* (2013.01); *H04W 88/184* (2013.01)

(58) Field of Classification Search
CPC ....... H04W 4/12; H04W 88/184; H04W 4/14; H04W 12/02; H04M 3/42008; H04M 2215/0108; H04M 3/42059
USPC .......................... 455/412.1, 412.2, 414.1, 466
See application file for complete search history.

(56) References Cited

U.S. PATENT DOCUMENTS

| | | | |
|---|---|---|---|
| 7,192,235 B2 * | 3/2007 | Blight et al. | 455/412.1 |
| 7,587,210 B2 | 9/2009 | Sweatman et al. | |
| 8,019,362 B2 | 9/2011 | Sweatman et al. | |
| 8,073,431 B2 | 12/2011 | Blight et al. | |
| 8,693,655 B1 * | 4/2014 | Chau et al. | 379/201.01 |
| 2006/0140200 A1 * | 6/2006 | Black et al. | 370/401 |
| 2007/0064895 A1 * | 3/2007 | Wong et al. | 379/142.09 |
| 2012/0100830 A1 * | 4/2012 | Barber et al. | 455/410 |
| 2013/0070672 A1 * | 3/2013 | McFarland et al. | 370/328 |

* cited by examiner

*Primary Examiner* — Charles Appiah
*Assistant Examiner* — Jaime Holliday

(57) ABSTRACT

Systems, methods, and software for transferring text messages are provided herein. A method includes indicating to a wireless communication device a temporary address number, receiving an instruction from a user of the wireless communication device to transfer a text message to a destination number using the temporary address number instead of a device number of the wireless communication device. The method also includes transferring the text message for delivery to the destination number, receiving a response text message from the destination number indicating the temporary address number as a response destination number, and transferring the response text message for delivery to the routing node associated with the temporary address number. The method also includes translating the response destination number of the response text message into the device number of the wireless communication device, and transferring the response text message for delivery to the wireless communication device using the device number.

8 Claims, 6 Drawing Sheets

TEMPORARY DEVICE NUMBERS FOR TEXT MESSAGING

TECHNICAL FIELD

Aspects of the disclosure are related to the field of communications, and in particular, sending and receiving text messages on wireless communication devices in wireless communication networks.

TECHNICAL BACKGROUND

Wireless communication systems, such as cellular voice and data networks, typically include wireless access nodes distributed over a geographic area through which wireless communication devices can register and receive wireless access to communication services. The wireless communication devices allow users to initiate communication sessions with other users or devices, such as phone calls, text messaging, or data access. However, when using voice calls or text messaging services, fixed device numbers for the wireless communication devices are used to identify and route the communication sessions through the various communication handling networks.

For example, a text message sent from a wireless communication device is sent using the mobile device number (MDN), such as a phone number, permanently associated with the wireless communication device which originated the text message. Likewise, when other devices or users desire to transfer a text message to the aforementioned wireless communication device, the mobile device number is used to identify the device and route the text message to that wireless communication device. These permanent or fixed mobile device numbers can lead to privacy issues and inhibit commercial transactions due to users unwilling to reveal identities of the wireless communication devices or the associated users.

OVERVIEW

Systems, methods, and software for transferring text messages in communication systems are provided herein. In one example, method of operating a communication system is provided. The method includes in a routing node, indicating to a wireless communication device a temporary address number. The method also includes, in a wireless communication device, receiving an instruction from a user of the wireless communication device to transfer a text message to a destination number using the temporary address number instead of a device number of the wireless communication device as an originating device number. The method also includes, in a wireless communication system, transferring the text message for delivery to the destination number indicating the temporary address number as the originating device number, receiving a response text message from the destination number indicating the temporary address number as a response destination number, and transferring the response text message for delivery to the routing node associated with the temporary address number. The method also includes, in the routing node, translating the response destination number of the response text message into the device number of the wireless communication device, and transferring the response text message for delivery to the wireless communication device using the device number.

In another example, a communication system is provided. The communication system includes a routing node configured to indicate to a wireless communication device a temporary address number. The communication system also includes a wireless communication device configured to receive an instruction from a user of the wireless communication device to transfer a text message to a destination number using the temporary address number instead of a device number of the wireless communication device as an originating device number. The communication system also includes a wireless communication system configured to transfer the text message for delivery to the destination number indicating the temporary address number as the originating device number, receive a response text message from the destination number indicating the temporary address number as a response destination number, and transfer the response text message for delivery to the routing node associated with the temporary address number. The routing node is also configured to translate the response destination number of the response text message into the device number of the wireless communication device, and transfer the response text message for delivery to the wireless communication device using the device number.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
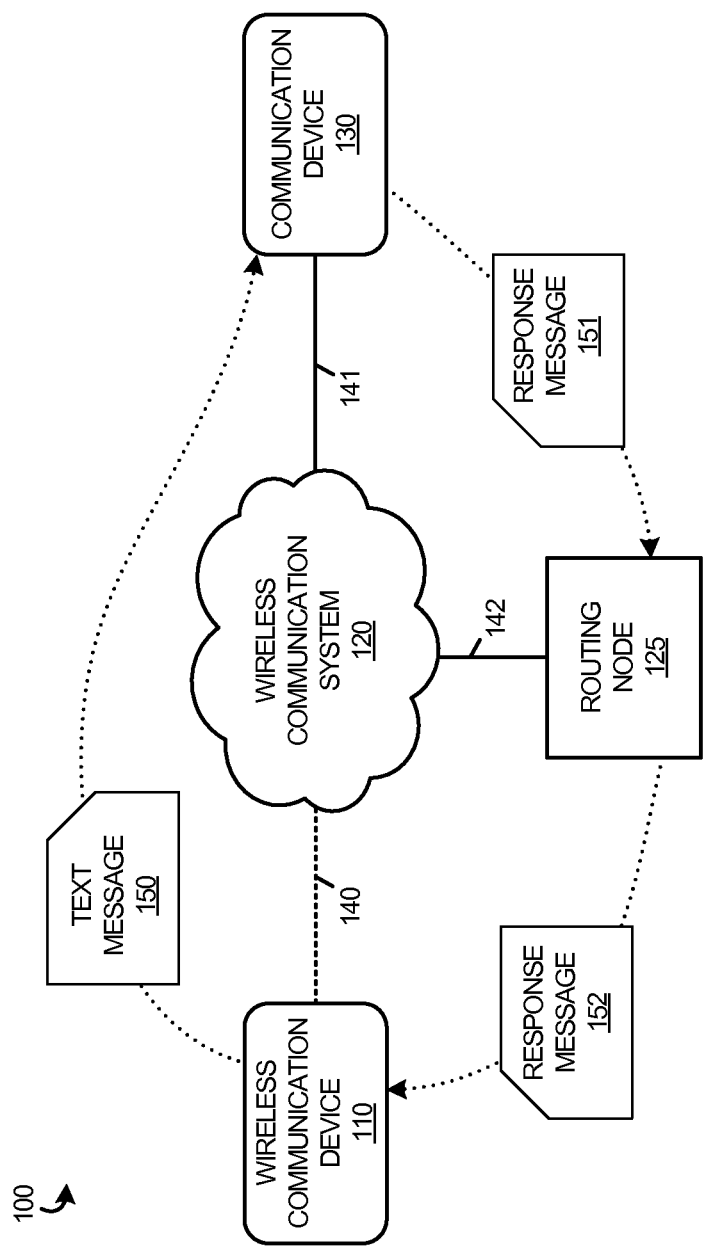
FIG. 1 is a system diagram illustrating a communication system.

FIG. 1 is a system diagram illustrating communication system 100. Communication system 100 includes wireless communication device 110, wireless communication system 120, routing node 125, and communication device 130. Wireless communication device 110 and wireless communication system 120 communicate over wireless link 140. Wireless communication system 120 and communication device 130 communicate over at least link 141. Wireless communication system 120 and routing node 125 communicate over at least link 142.

In operation, wireless communication device 110 receives wireless access to communication services from wireless communication system 120, such as via one or more wireless access nodes, not shown in FIG. 1 for clarity. These communication services can include voice calls, text messages, multimedia streaming, data access, or other communication services. Wireless communication system 120 can route communications associated with wireless communication device 110 for exchange with various other devices or systems, such as communication device 130.

For example, wireless communication device 110 can transfer text message 150 for delivery to communication device 130, and wireless communication system 120 can route text message 150 as shown in FIG. 1. Likewise, communication device 130 can transfer response message 151 for delivery to wireless communication device 110. However, response message 151 is routed differently in wireless communication system 120, as shown in FIG. 1 and discussed further in FIG. 2.

Figure 2:
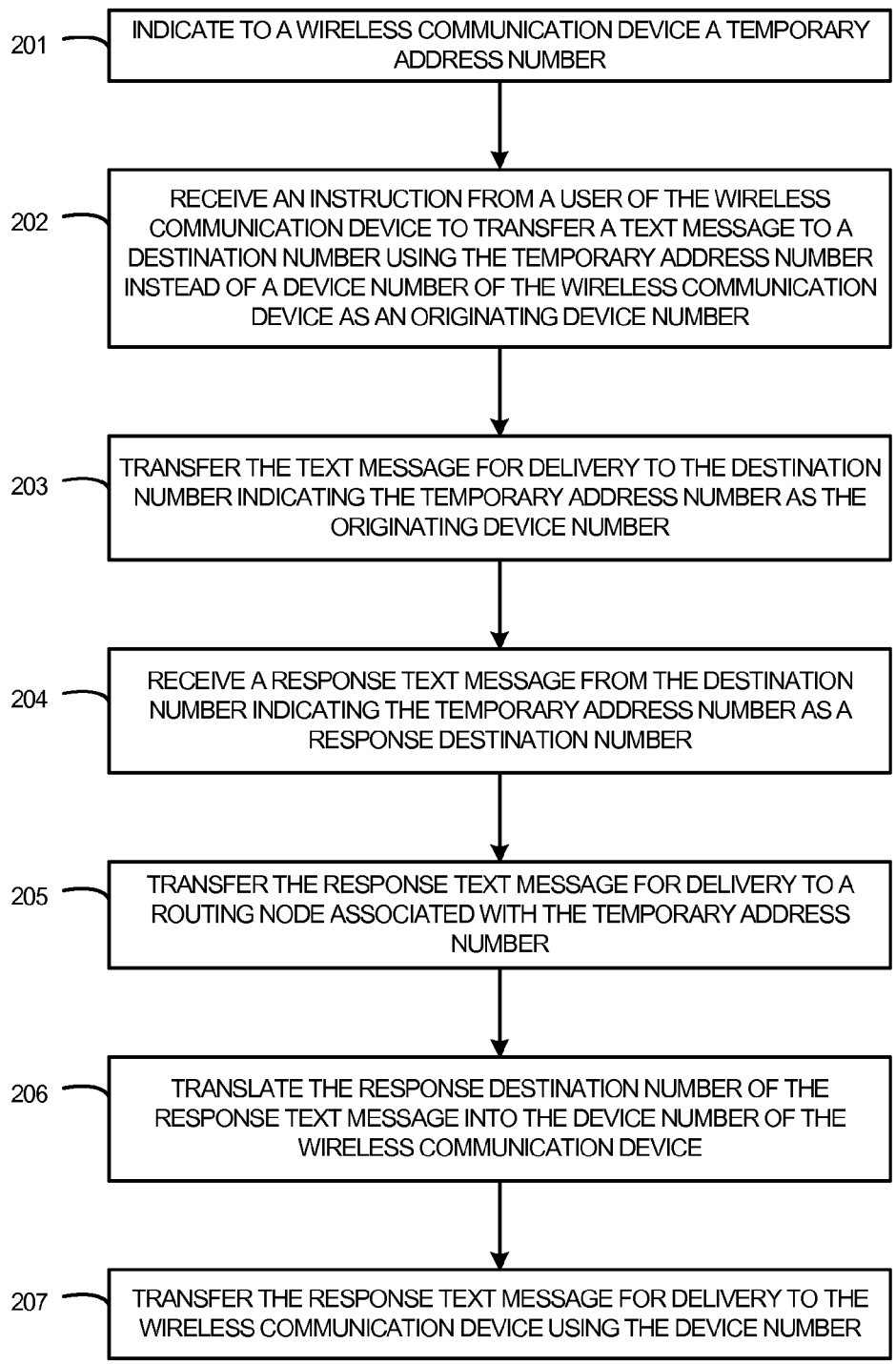
FIG. 2 is a flow diagram illustrating a method of operation of a communication system.

FIG. 2 is a flow diagram illustrating a method of operation of communication system 100. The operations of FIG. 2 are referenced below parenthetically. In FIG. 2, routing node 125 indicates (201) to wireless communication device 110 a temporary address number. The temporary address number can be a phone number, such as a 10-digit or 456-555-1111 style number for use in the United States. Other countries may have different phone numbering schemes. The temporary address number can comprise a numerical address used to identify a destination device, such as a destination phone, telephone system, wireless communication device, and the like. Routing node 125 can store an association or correlation between the temporary address number and the device number for wireless communication device 110. A data structure, such as a database, can be employed in routing node 125 for storing the association. In some examples, wireless communication device 110 requests a temporary address number from routing node 125, and routing node 125 responsively transfers the temporary address number for delivery to wireless communication device 110 over at least links 142 and 140.

Wireless communication device 110 receives (202) an instruction from a user of wireless communication device 110 to transfer a text message to a destination number using the temporary address number instead of a device number of wireless communication device 110 as an originating device number. The text message, such as text message 150, can comprise a short message service (SMS) or multimedia message service (MMS) message, among others. The instruction can be a user instruction received in a user application or user interface of wireless communication device. The instruction can include a user message, such as text or multimedia content for delivery to a destination. The instruction can also include an indication on a destination number, such as a destination telephone number, to be used in delivery of the text message. In some examples, a graphical user interface element is presented which allows a user of wireless communication device 110 to select from among the device number associated with wireless communication device 110 and the temporary address number provided by routing node 125.

Wireless communication system 120 transfers (203) text message 150 for delivery to the destination number indicating the temporary address number as the originating device number. In this example, wireless communication device 110 transfers text message 150 over wireless link 140, and elements of wireless communication system 120 route text message 150 for delivery to communication device 130 over at least link 141. Communication device 130 is identified by the destination number in text message 150, and wireless communication system 120 routes text message 150 based on at least this destination number, which may include routing text message 150 over other communication networks. Instead of the device number normally associated with wireless communication device 110, such as the phone number of wireless communication device 110, the temporary address number is used as the source or originating device number. For example, the phone number communication device 130 finds in text message 150 as the originating device number is the temporary address number, and the device number of wireless communication device 110 is not presented to communication device 130 in text message 150.

Wireless communication system 120 receives (204) a response text message, such as response text message 151, from the destination number indicating the temporary address number as a response destination number. Communication device 130 receives the text message transferred by wireless communication device 110 and responsively creates response text message 151. In this example, since the originating device number received with the text message was the temporary address number, then communication device 130 creates response text message 151 using the temporary address number as the destination number. Communication device 130 transfers response text message 151 for delivery to the temporary address number, and elements of wireless communication system 120 receive response text message 151.

Wireless communication system 120 transfers (205) response text message 151 for delivery to a routing node associated with the temporary address number. The temporary address number used as the destination number in response text message 151 is routed to routing node 125. Wireless communication system 120 routes response text message 151 to routing node 125 instead of wireless communication device 110. The temporary address number is configured to route to routing node 125. Routing tables or routing equipment of wireless communication system 120 can be configured to route response text message 151 using the temporary address number to routing node 125 based on a portion of the temporary address number, such as an 'area code' or other portion.

Routing node 125 translates (206) the response destination number of response text message 151 into the device number of wireless communication device 110. Routing node 125 receives response text message 151 and processes the temporary address number to determine that the device number of wireless communication device 110 is presently correlated to the temporary address number. The temporary address number can be removed from the destination portion of response text message 151 and replaced with the device number of wireless communication device 110 to create response text message 152. A data structure or database system can be employed to store and retrieve the relationship between the temporary address number and the device number of wireless communication device 110.

Routing node 125 transfers (207) response text message 152 for delivery to wireless communication device 110 using the device number. Routing node 125 transfers response text message 152 using the device number of wireless communication device as the destination number for response text message 152 instead of the temporary address number. Wireless communication system 120 then routes response text message 152 for delivery to wireless communication device 110 based on the device number of wireless communication device 110. Wireless communication device 110 can then receive response text message 152.

In some examples, the temporary address number is indicated in a portion of response text message 152 even though the destination number of response text message 152 is the device number of wireless communication device 110. For example, the temporary address number can be prepended or appended to the user text message content of response text message 152 to indicate to a user of wireless communication device 110 that response text message 152 was addressed to the temporary address number initially.

Figure 3:
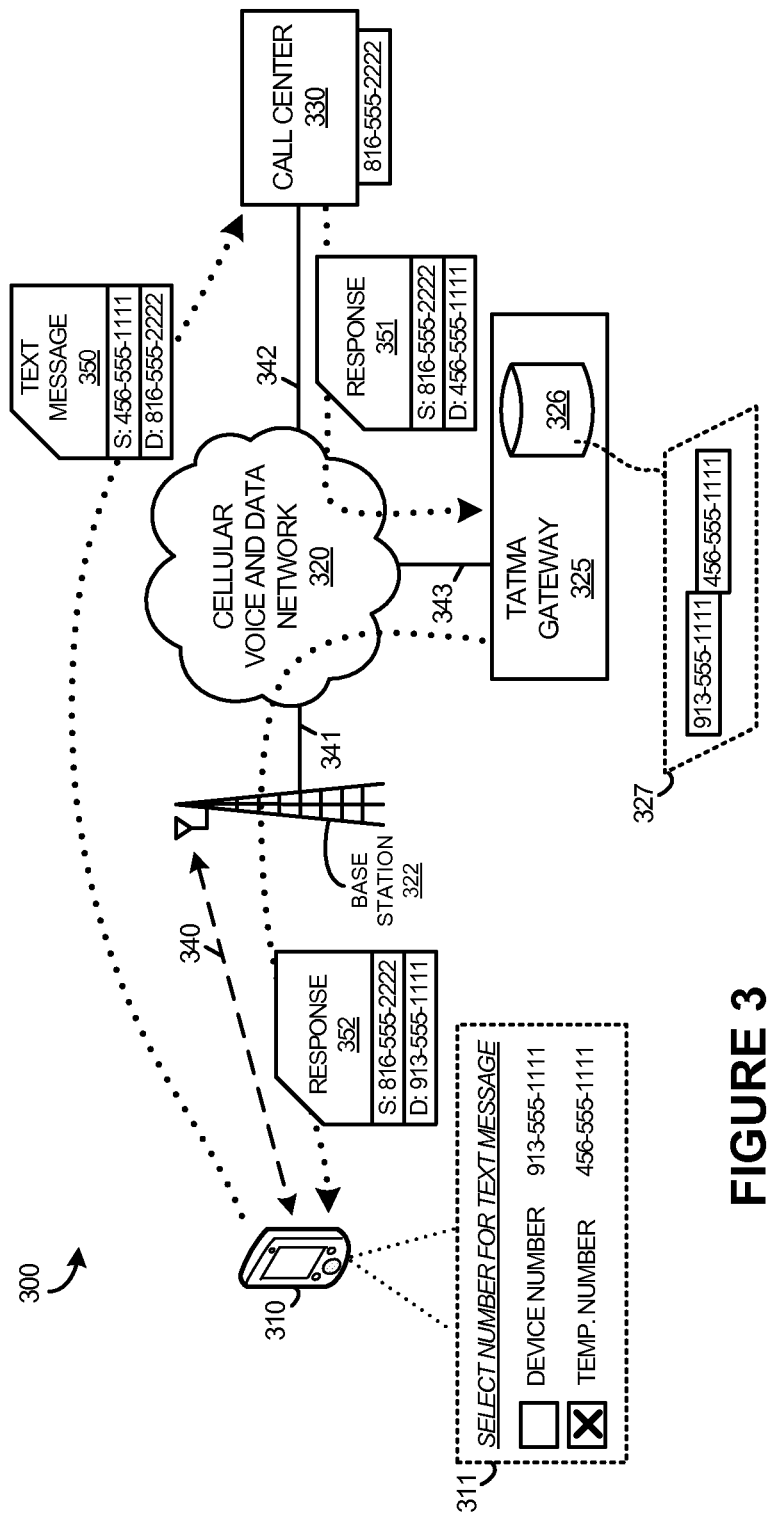
FIG. 3 is a system diagram illustrating a communication system.

FIG. 3 is a system diagram illustrating communication system 300. Communication system 300 includes user device 310, base station 322, cellular voice and data network 320, temporary assigned text message address (TATMA) gateway 325, and call center 330. User device 310 and base station 322 communicate over wireless link 340 which is a cellular voice and data link in this example, such as that described for wireless link 140. Base station 322 and cellular voice and data network 320 communicate over backhaul link 341 which is a T1 link in this example. Call center 330 and cellular voice and data network 320 communicate over link 342 which comprises a T1 link in this example. TATMA gateway 325 and cellular voice and data network 320 communicate over link 343 in this example which comprises a packet network link in this example.

User device 310 is a cellular communication device, such as a smartphone. User device 310 includes various graphical user interface elements, such as graphical user interface element 311 indicating a choice for source phone number for a text message. Base station 322 comprises wireless transceiver equipment and antenna equipment, and provides wireless access to communication services for user devices. Cellular voice and data network 320 comprises routers, switching equipment, authorization equipment, further base stations, and other various systems and equipment to provide wireless access to communication services to user devices over a geographic area. TATMA gateway 325 comprises computer and processing systems, including network and telephonic interface systems. TATMA gateway 325 includes database system 326 which stores at least associations or correlations between device phone numbers and temporary phone numbers in one or more data structures. Call center 330 comprises telephonic equipment and network interface systems for receiving text messages and sending responses to text messages over at least link 342.

Figure 4:
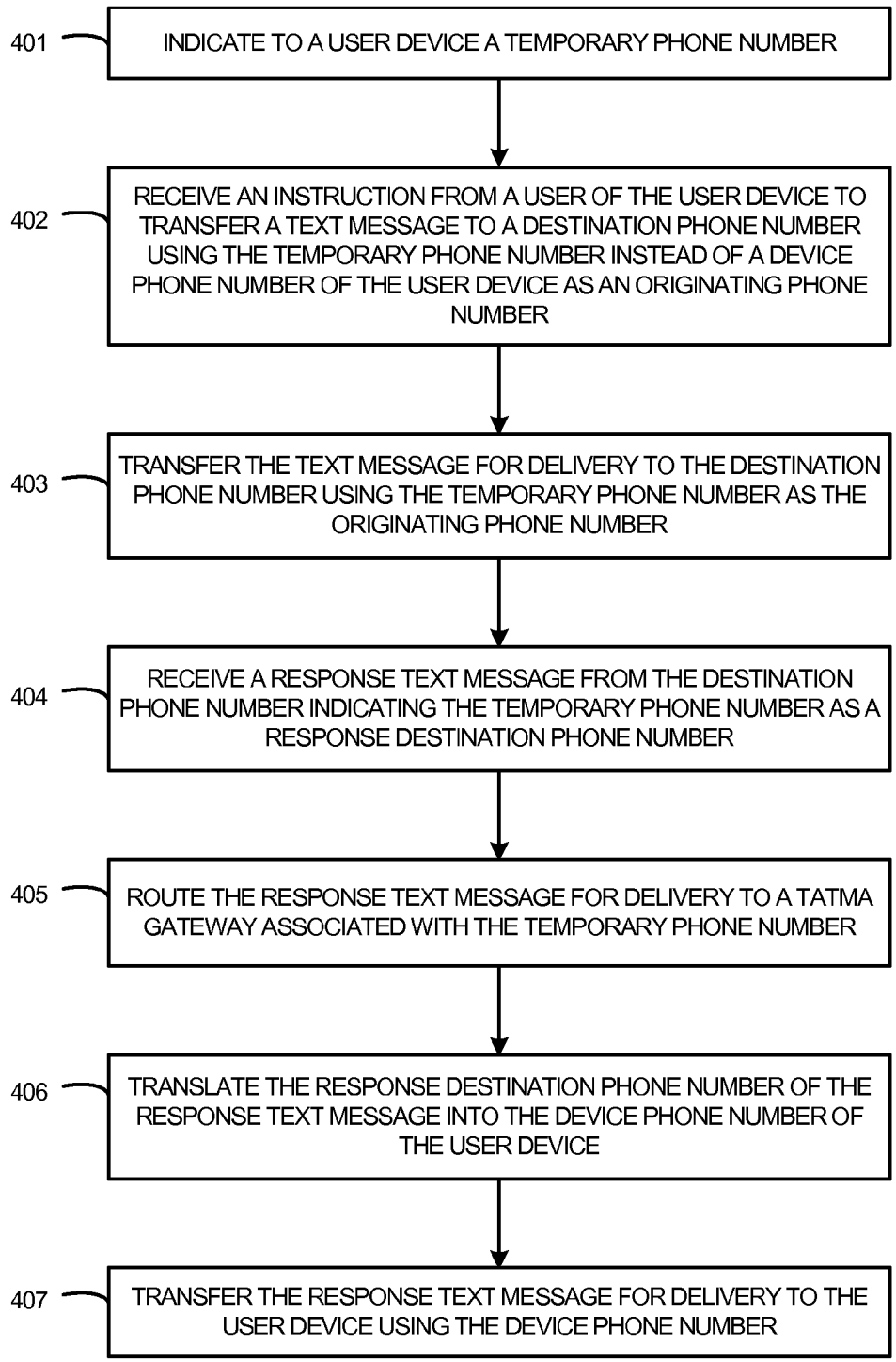
FIG. 4 is a flow diagram illustrating a method of operation of a communication system.

FIG. 4 is a flow diagram illustrating a method of operation of communication system 300. The operations of FIG. 4 are referenced below parenthetically. In FIG. 4, TATMA gateway 325 indicates (401) to a user device a temporary phone number. In this example, the temporary phone number is 456-555-1111. TATMA gateway 325 can receive a request for a temporary phone number transferred by user device 310, and can receive the device phone number for user device 310 along with the request. The device phone number for user device 310 is 913-555-1111 in this example. The device phone number can comprise a fixed mobile device number (MDN) or other numerical address used to identify user device 310 on a voice network, such as cellular voice and data network. In this example, the device phone number is not an Internet protocol (IP) address or a media access control (MAC) address of a data transceiver portion of user device 310, and is instead an identifier or phone number of a voice or text message portion of user device 310.

The temporary phone number assigned to user device 310 can comprise a newly assigned number, or a number which has been previously assigned as a temporary phone number to user device 310. The temporary phone number is typically of the same format or scheme as the device phone number. As shown in FIG. 3, the device number is a 10-digit phone number, and the temporary phone number is also a 10-digit phone number. In further examples, a time limit can be associated with the temporary phone number by TATMA gateway 325. The time limit can comprise a time period, such as number of minutes, hours, or days, for which the temporary phone number is valid for user device 310. The time limit can comprise a quantity of uses, where each text message sent or received by user device 310 which is routed through TATMA gateway 325 decrements the remaining quantity of uses, and when the present quantity of uses falls to zero then the temporary phone number can be invalidated for user device 310 by TATMA gateway 325. Other temporary or transient indicators for the limited use of the temporary phone number can be employed, such as an indication by user device 310 or TATMA gateway 325 that the temporary phone number is no longer desired or valid. If a temporary phone number is discontinued or invalidated for user device 310, a grace period can be employed by TATMA gateway 325 to ensure that another user device does not get assigned the same temporary phone number by TATMA gateway 325 within a predetermined period of time.

User device 310 receives (402) an instruction from a user of the user device to transfer a text message to a destination phone number using the temporary phone number instead of a device phone number of the user device as an originating or source phone number. Graphical user interface element 311 presents the selection from among the device phone number of 913-555-1111 and the temporary phone number 456-555-1111. In this example, the instruction is received over a user input element of user device 310, such as a keypad, touchscreen, mouse, voice activation, or other user input element. During entry or creation of a text message on user device 310, a user can select from among the device phone number and the temporary phone number. In some examples, responsive to a user selecting to send the text message, a graphical user prompt is presented which allows the user to select from among the device phone number or the temporary phone number. A popup prompt can be presented in some examples responsive to the send command or to a user selection box configured to change the origin phone number of the text message. The user also typically selects the destination phone number, such as from a phone book data structure or a manual entry.

User device 310 transfers (403) text message 350 for delivery to the destination phone number using the temporary phone number as the source phone number. The source or originating phone number is indicated by 456-555-1111 in FIG. 1, and demarked by an 'S', while the destination phone number is indicated by 816-555-2222 in FIG. 1, and demarked by a 'D'. Base station 322 receives text message 350 and transfers text message 350 to elements of cellular voice and data network 320 which identify and route text message 350 for delivery to call center 330 over at least link 342.

Call center 330 receives text message 350 and processes text message 350 to determine a response to text message 350. The response can be based on the user content of the text message, such as a user of user device 310 requesting information, coupons, product information, or a user providing information such as voting on a television show, or other information, including combinations thereof. Call center 330 determines the response to text message 350 as response text message 351, and transfers response text message 351 for delivery to the source phone number provided in text message 350. The source phone number of response text message 351 is the phone number associated with call center 330, namely 816-555-2222. The destination phone number of response text message 351 is the source phone number received with text message 350, namely 456-555-1111, and is referred to below as the response destination phone number.

Elements of cellular voice and data network 320 receive (404) response text message 351 from call center 330 indicating the temporary phone number as the response destination phone number. Routing elements or tables of cellular voice and data network 320 route (405) response text message 351 for delivery to TATMA gateway 325 associated with the temporary phone number. The temporary phone number, namely 456-555-1111 is not routed to user device 310, and instead is routed to TATMA gateway 325. TATMA gateway 325 then receives response text message 351.

TATMA gateway 325 translates (406) the response destination phone number of response text message 351 into the device phone number of user device 310. In this example, the device phone number of user device 310 is 913-555-1111. Data structure 326 stores the relationship between the temporary phone number and the device phone number for user device 310, and TATMA gateway 325 uses data structure 326 to translate the response destination phone number into the device phone number of user device 310, as shown in data relationship 327. In examples where the association or relationship between the temporary phone number and the device phone number for user device 310 has expired or reached a time limit, then TATMA gateway can determine that no relationship presently exists and indicate an error text message to call center 330 or cellular voice and data network 320, while inhibiting transfer of response text messages 352.

TATMA gateway 325 transfers (407) response text message 352 for delivery to user device 310 using the device phone number of user device 310. As shown in FIG. 1, response text message 352 has been modified from response text message 351. Specifically, at least the destination 'D' phone number has been changed from the temporary phone number received as the response destination phone number in response text message 351 to the device phone number of user device 310. Thus, the 456-555-1111 number has been replaced by 913-555-1111 in response text message 352. TATMA gateway 325 transfers response text message 352 over link 343, and cellular voice and data network 320 responsively routes response text message 352 for delivery to user device 310 since the destination phone number of response text message 352 indicates the device phone number of user device 310.

The temporary phone number used in this example can be from a set or pool of temporary phone numbers maintained by TATMA gateway 325. Cellular voice and data network 320 can route all temporary phone numbers in the pool to TATMA gateway 325, such as when a special or unique numbering scheme is used to associated TATMA gateway 325 with the set of phone numbers. Advantageously, elements of cellular voice and data network 320 need not be reconfigured to route text messages using the temporary phone number to user device 310 each time user device 310 uses a different temporary phone number as a source phone number. TATMA gateway 325 provides interworking features to translate and route text messages to device phone numbers based on the temporary phone numbers.

In some examples, the temporary phone number is indicated in another portion of response text message 352 even though the destination number of response text message 352 is the device phone number of user device 310. For example, the temporary phone number can be prepended or appended to user content of response text message 352 to indicate to a user of user device 310 that response text message 352 was originally directed to the temporary phone number by call center 330.

Figure 5:
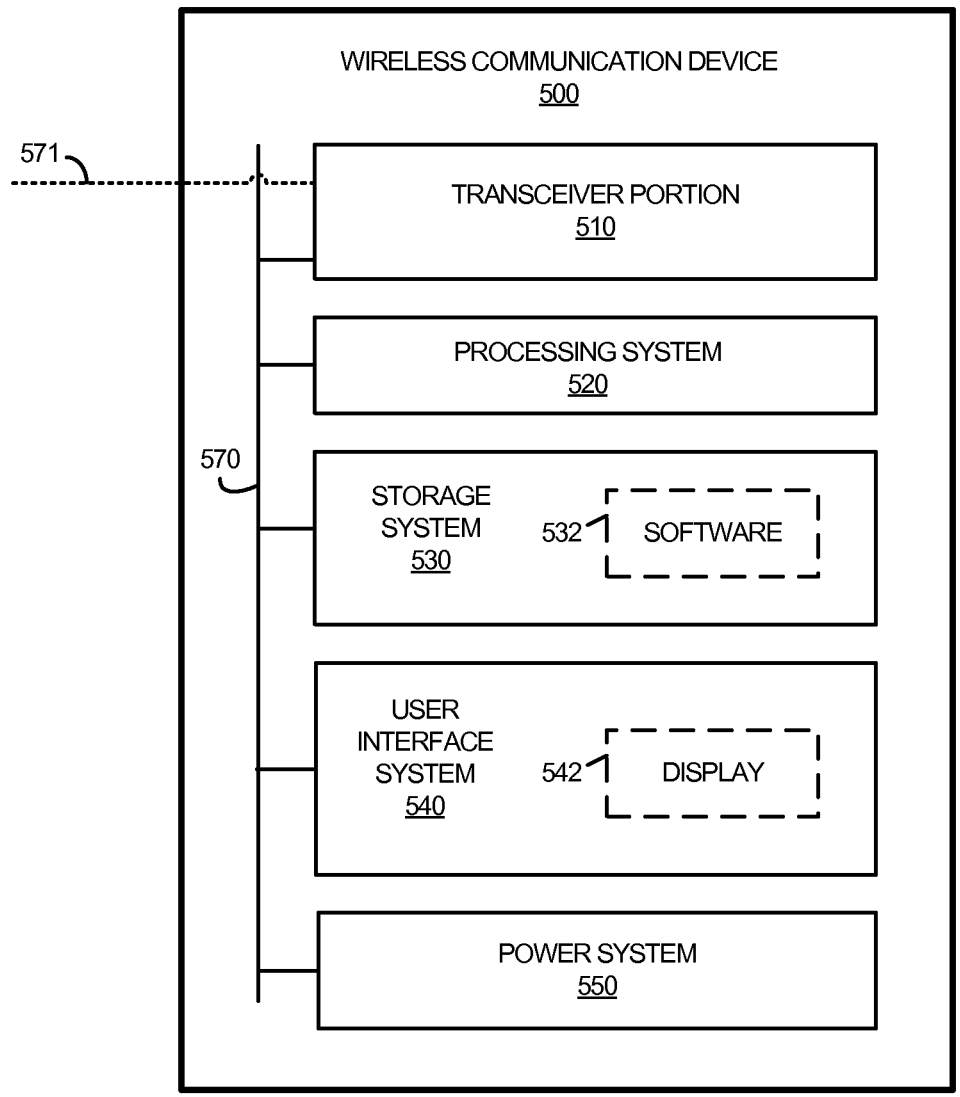
FIG. 5 is a block diagram illustrating a wireless communication device.

FIG. 5 is a block diagram illustrating wireless communication device 500, as an example of wireless communication device 110 found in FIG. 1 or user device 310 found in FIG. 3, although wireless communication device 110 or user device 310 could use other configurations. Wireless communication device 500 includes transceiver system 510, processing system 520, storage system 530, user interface system 540, and power system 550. Transceiver system 510, processing system 520, storage system 530, user interface system 540, and power system 550 are shown to communicate over a common bus 570 for illustrative purposes. It should be understood that discrete links could be employed, such as data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Transceiver system 510 comprises one or more antenna elements and communication interface circuitry for communicating with wireless access nodes of a wireless communication network, such as with base stations of a cellular voice and data network. Transceiver system 510 could include transceiver equipment and antenna elements for wirelessly exchanging user communications and overhead communications over the associated wireless link 571, among further wireless links. Transceiver system 510 also receives command and control information and instructions from processing system 520 or user interface system 540 for controlling the operations of wireless communications over wireless link 571. Wireless link 571 could use various protocols or communication formats as described herein for wireless links 140 or 340, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media or storage device readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to communicate with wireless communication systems over wireless links, receive temporary address numbers, create and transfer text messages to temporary address numbers, and receive text messages, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to communicate with wireless communication systems over wireless links, receive temporary address numbers, create and transfer text messages to temporary address numbers, and receive text messages.

In general, software 532 can, when loaded into processing system 520 and executed, transform processing system 520 overall from a general-purpose computing system into a special-purpose computing system customized to communicate with wireless communication systems over wireless links, receive temporary address numbers, create and transfer text messages to temporary address numbers, and receive text messages, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text messages or video messages, among other operations. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, graphical user interfaces, indicator lights, lamps, light-emitting diodes, haptic feedback devices, audible signal transducers, speakers, buzzers, alarms, vibration devices, or other indicator equipment, including combinations thereof.

Power system 550 includes circuitry and a power source to provide power to the elements of wireless communication device 500. The power source could include a battery, solar cell, flywheel, capacitor, thermoelectric generator, chemical power source, dynamo, or other power source. In some examples, power system 550 receives power from an external source, such as a wall outlet or power adapter. Power system 550 also includes circuitry to condition, monitor, and distribute electrical power to the elements of wireless communication device 500.

Bus 570 comprises a physical, logical, or virtual communication link, capable of communicating data, control signals, and communications, along with other information. In this example, bus 570 also includes RF and power distribution elements, such as wires, circuit board traces, or other elements. In some examples, portions of bus 570 are encapsulated within the elements of transceiver system 510, processing system 520, storage system 530, user interface system 540, or power system 550, and can be a software or logical link. In other examples, bus 570 uses various communication media, such as air, space, metal, optical fiber, or some other signal propagation path, including combinations thereof. Bus 570 could be a direct link or might include various equipment, intermediate components, systems, and networks.

Figure 6:
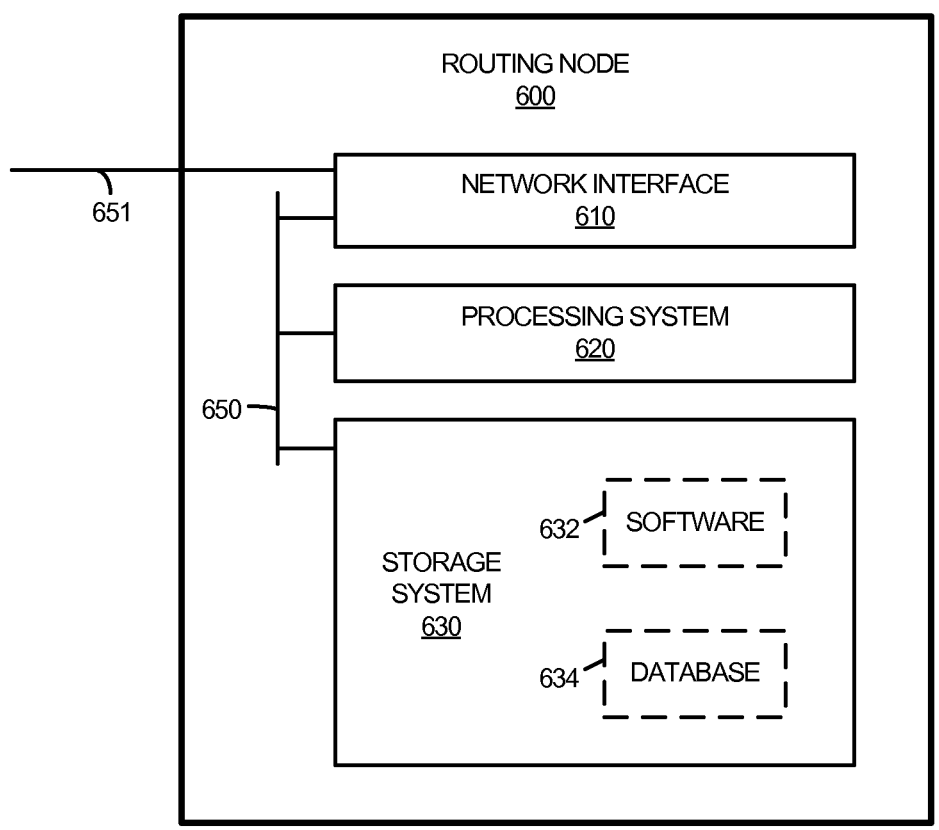
FIG. 6 is a block diagram illustrating a routing node.

FIG. 6 is a block diagram illustrating routing node 600, as an example of routing node 125 of FIG. 1 or TATMA gateway 325 of FIG. 3, although routing node 125 and TATMA gateway 325 can use other configurations. Routing node 600 includes network interface 610, processing system 620, and storage system 630. Network interface 610, processing system 620, and storage system 630 are shown to communicate over a common bus 650 for illustrative purposes. It should be understood that discrete links can be employed, such as data links, power links, RF links, or other links. Routing node 600 can be distributed or consolidated among equipment or circuitry that together forms the elements of routing node 600. Routing node 600 can optionally include additional devices, features, or functionality not discussed here for purposes of brevity.

Network interface 610 comprises one or more transceivers and communication interface circuitry for communicating over a network with a communication system, such as with a cellular voice and data network. Network interface 610 also receives command and control information and instructions from processing system 620 for controlling the operations of communications over link 651. Link 651 can use various protocols or communication formats as described herein for links 142 and 343, including combinations, variations, or improvements thereof.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media or storage device readable by processing system 620 and capable of storing software 632 and database 634. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 or database 634 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 and database 634 can be implemented in program instructions and among other functions can, when executed by routing node 600 in general or processing system 620 in particular, direct routing node 600 or processing system 620 to identify temporary address numbers for wireless communication devices, transfer temporary address numbers for delivery to wireless communication devices, receive text messages transferred to temporary address numbers, translate the temporary address numbers to device numbers associated with wireless communication devices, and transfer text messages using the translated device numbers for delivery to wireless communication devices, among other operations. Software 632 can include additional processes, programs, or components, such as operating system software, database software, or application software. Software 632 or database 634 can also comprise firmware or some other form of machine-readable processing instructions executable by processing system 620. Typically, database 634 comprises one or more data structures configured to store associations or correlations between device numbers of wireless communication devices and temporary address numbers, along with associated time limits for the associations or correlations. Database 634 can be accessed or read by processing system 620 during execution of software 632.

In at least one implementation, the program instructions can include first program instructions that direct processing system 620 to identify temporary address numbers for wireless communication devices, transfer temporary address numbers for delivery to wireless communication devices, receive text messages transferred to temporary address numbers, translate the temporary address numbers to device numbers associated with wireless communication devices, and transfer text messages using the translated device numbers for delivery to wireless communication devices.

In general, software 632 can, when loaded into processing system 620 and executed, transform processing system 620 overall from a general-purpose computing system into a special-purpose computing system customized to identify temporary address numbers for wireless communication devices, transfer temporary address numbers for delivery to wireless communication devices, receive text messages transferred to temporary address numbers, translate the temporary address numbers to device numbers associated with wireless communication devices, and transfer text messages using the translated device numbers for delivery to wireless communication devices, among other operations. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 or database 634 can transform the physical state of the semiconductor memory when the program is encoded therein. For example, software 632 or database 634 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Bus 650 comprises a physical, logical, or virtual communication link, capable of communicating data, control signals, and communications, along with other information. Bus 650 also can include RF and power distribution elements, such as wires, circuit board traces, or other elements. In some examples, portions of bus 650 are encapsulated within the elements of network interface 610, processing system 620, and storage system 630, and can be a software or logical link. In other examples, bus 650 uses various communication media, such as air, space, metal, optical fiber, or some other signal propagation path, including combinations thereof. Bus 650 can be a direct link or might include various equipment, intermediate components, systems, and networks.

Referring back to FIG. 1, wireless communication device 110 can comprise one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication system 120 comprises communication and control systems for providing access to communication services for user devices. Wireless communication system 120 can provide communication services including voice calls, text messages, data access, or other communication services provided over cellular or wireless communication networks. In some examples, wireless communication system 120 includes equipment to provide wireless access to communication services within different coverage areas to wireless communication devices, route communications between content providers and user devices, and facilitate handoffs between equipment of different coverage areas, among other operations. Wireless communication system 120 can also comprise elements such as radio access network (RAN) equipment, E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Routing node 125 can include communication or network interfaces, as well as computer systems, microprocessors, user interfaces, databases, circuitry, or some other processing devices or software systems, and can be distributed among multiple processing devices. Examples of routing node 125 can also include software such as an operating system, logs, databases, utilities, drivers, networking software, and other software stored on a computer-readable medium. Routing node 125 can comprise a temporary assigned text message address (TATMA) gateway or number manager system.

Wireless link 140 can use the air or space as the transport media. Wireless link 140 comprises one or more wireless communication links provided over an associated wireless frequency spectrum or wireless frequency band, and can use various protocols. Wireless link 140 can comprise a wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for wireless link 140 is shown in FIG. 1, it should be understood that wireless link 140 is merely illustrative to show communication modes or wireless access pathways for wireless communication device 110. In other examples, further wireless links can be shown, with portions of the further wireless links shared and used for different communication sessions or different content types, among other configurations.

Communication links 141-142 each use metal, glass, optical, air, space, or some other material as the transport media. Communication links 141-142 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 141-142 can each be a direct link or can include intermediate networks, systems, or devices, and can include a logical network link transported over multiple physical links.

Links 140-142 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device having a device phone number to transfer one of a Short Message Service (SMS) message and a Multimedia Message Service (MMS) message, the method comprising:
   receiving an instruction from a user of the wireless communication device to transfer the one of the SMS message and the MMS message to a destination and in response, presenting a graphical user interface element allowing a user of the wireless communication device to select one of the device phone number and a temporary phone number as the originating phone number for the one of the SMS message and the MMS message;
   receiving an instruction from the user of the wireless communication device to transfer the one of the SMS message and the MMS message to a destination using the temporary phone number as the originating phone number for the one of the SMS message and the MMS message; and
   transferring the one of the SMS message and the MMS message for delivery to the destination indicating the temporary phone number as the originating phone number.

2. The method of claim 1 wherein the temporary phone number has a time limit for use in a response message to the wireless communication device.

3. The method of claim 2 further comprising indicating the time limit to the user.

4. The method of claim 2 further comprising indicating the time limit in the one of the SMS message and the MMS message.

5. A wireless communication device having a device phone number to transfer one of a Short Message Service (SMS) message and a Multimedia Message Service (MMS) message, comprising:
   a user display configured to receive an instruction from a user of the wireless communication device to transfer the one of the SMS message and the MMS message to a destination and in response, present a graphical user interface element allowing a user of the wireless communication device to select one of the device phone number and a temporary phone number as the originating phone number for the one of the SMS message and the MMS message, and receive an instruction from the user of the wireless communication device to transfer the one of the SMS message and the MMS message to a destination number using the temporary phone number as the originating phone number for the one of the SMS message and the MMS message; and
   a wireless communication transceiver configured to transfer the one of the SMS message and the MMS message for delivery to the destination number indicating the temporary phone number as the originating phone number.

6. The wireless communication device of claim 5 wherein the temporary phone number has a time limit for use in a response message to the wireless communication device.

7. The wireless communication device of claim 6 comprising the user display configured to indicate the time limit to the user.

8. The wireless communication device of claim 6 comprising the user display configured to indicate the time limit in the one of the SMS message and the MMS message.

* * * * *